United States Patent [19]
Kinoshita et al.

[11] Patent Number: 4,955,638
[45] Date of Patent: Sep. 11, 1990

[54] DECELERATION SENSOR HAVING SAFETY CATCH MEANS

[75] Inventor: Yoshihiko Kinoshita; Hiroshi Tabata; Mitsuru Goto; all of Saitama, Japan

[73] Assignee: Honda Giken Kogyo Kabushiki Kaisha, Tokyo, Japan

[21] Appl. No.: 250,782

[22] Filed: Sep. 28, 1988

[30] Foreign Application Priority Data

| Sep. 29, 1987 | [JP] | Japan | 62-244873 |
| Sep. 29, 1987 | [JP] | Japan | 62-244874 |
| Sep. 29, 1987 | [JP] | Japan | 62-244875 |
| Sep. 29, 1987 | [JP] | Japan | 62-148690[U] |

[51] Int. Cl.$^5$ .................................... B62R 22/36
[52] U.S. Cl. ................... 280/806; 42/70.08; 280/737
[58] Field of Search .......... 280/806, 741, 737, 736, 280/734; 42/70.08; 200/61.58 B; 307/10 SB; 116/203, 215; 180/282

[56] References Cited

U.S. PATENT DOCUMENTS

| 2,626,474 | 1/1953 | Lochhead | 42/70.08 |
| 3,601,081 | 8/1971 | Smith | 280/734 |
| 3,749,282 | 7/1973 | Day et al. | 280/734 |
| 4,573,322 | 3/1986 | Fohl | 280/806 |
| 4,573,706 | 3/1986 | Breed | 280/734 |
| 4,580,810 | 4/1986 | Thuen | 280/734 |
| 4,647,071 | 3/1987 | Tabata | 280/806 |

FOREIGN PATENT DOCUMENTS

| 2821152 | 11/1979 | Fed. Rep. of Germany | 280/806 |
| 3531856 | 12/1986 | Fed. Rep. of Germany | 280/806 |
| 3629300 | 3/1988 | Fed. Rep. of Germany | 280/806 |
| 60-259553 | 12/1985 | Japan | |

Primary Examiner—Charles A. Marmor
Assistant Examiner—Eric Culbreth
Attorney, Agent, or Firm—Armstrong, Nikaido, Marmelstein, Kubovcik & Murray

[57] ABSTRACT

A deceleration sensor for detecting a threshold level of deceleration indicative of vehicle crash, comprising a sensor mass, a spring-loaded firing pin received in a guide bore, a trigger lever for engaging the firing pin in a dormant state until the trigger lever is disengaged from the sensor mass as a result of the occurrence of a deceleration in excess of the threshold level and the resulting inertia motion of the sensor mass, and a safety catch which may include a rotary shaft extending perpendicular to the plane of the inertia motion of the sensor mass and a part of a front end portion of the guide bore, the rotary shaft being provided with a first notch and a second notch which, respectively, permits and prohibits the propulsion of the firing pin through the guide bore by aligning with the guide bore. The reliability and safety of this deceleration sensor are improved by preventing the spooling out of the seat belt when the safety catch is on, prohibiting the release of the safety catch when the firing pin is disengaged from the trigger lever, and preventing the motion of the sensor mass as well as the firing pin when the safety catch is on.

9 Claims, 7 Drawing Sheets

DECELERATION SENSOR HAVING SAFETY CATCH MEANS

TECHNICAL FIELD

The present invention relates to a deceleration sensor for activating a passive occupant restraint system of a vehicle by detecting a level of deceleration which is indicative of vehicle crash, and in particular to such a deceleration sensor which is provided with safety catch means for disarming the deceleration sensor.

BACKGROUND OF THE INVENTION

A seat belt for restraining a vehicle occupant from being thrown from the seat of the vehicle in case of vehicle crash is required to be capable of positively restraining the occupant and yet permitting some freedom of motion to the occupant. A spring loaded retractor having an inertia lock mechanism serves such a purpose but a slight pay out or spool out of the belt from the retractor is unavoidable in case of a crash and some slack is always present even before the occurrence of a crash. Such a slack in the seat belt is undesirable because upon occurrence of a crash the occupant is initially thrown forward as far as permitted by the slack of the seat belt and then abruptly stopped by the seat belt. Therefore, if an excessive slack is present in the seat belt, the seat belt is incapable of achieving its full capability to positively restrain the vehicle occupant in case of vehicle crash. Therefore, it is desirable to reduce any such slack in the seat belt to a smallest possible level so as to reduce such a delayed action of the seat belt to restrain the vehicle occupant without unduly restricting the freedom of motion to the vehicle occupant under normal condition.

Japanese Pat. laid open publication No. 60-259553 proposes a device for tightening a seat belt upon detection of a certain level of deceleration. U.S. Pat. No. 4,580,810 discloses a passive occupant restraint system in the form of an air bag fitted into a steering wheel so as to rapidly inflate upon detection of a crash.

In any of these passive occupant restraint systems, it is essential for the system to be able to be activated without fail when required and otherwise stay dormant because unnecessary activation of such a system not only imposes a great inconvenience on the occupant but also may prevent the driver from handling the vehicle in a safe fashion.

In copending U.S. Pat. application No. 132,257 filed Dec. 14, 1987, there is proposed a deceleration sensor which comprises a pair of sensor masses which act upon a single trigger member with the aim of improving the reliability of the action of the sensor when a level of deceleration indicative of a vehicle crash is detected. Another copending U.S. Pat. application No. 203,809 discloses a similar deceleration sensor, but in this case the trigger means is activated only when both the sensor masses are displaced by inertia. Thus, the deceleration sensor is protected from undesired activation. The contents of these copending application are incorporated herein by reference.

Now, such deceleration sensors must be kept disarmed by means of a safety catch or the like before they are installed into the vehicles for the convenience of the handling of these sensors. Conversely, after they are installed into the vehicle, they must be armed again. Therefore, it is highly desirable to provided a deceleration sensor which is provided with means for keeping the acceleration sensor disarmed which is both reliable and easy to operate, and means for positively ensuring the acceleration sensor to be armed again after being installed into the vehicles.

BRIEF SUMMARY OF THE INVENTION

In view of such a desire to improve the reliability of deceleration sensors in passive occupant restraint systems for vehicles, a primary object of the present invention is to provide a deceleration sensor having safety catch means which is both reliable and easy to operate.

A second object of the present invention is to provide a deceleration sensor having safety catch means which is provided with means for preventing the failure to arm the safety catch means after it is installed into a vehicle.

These and other objects of the present invention can be accomplished by providing a deceleration sensor for releasing energy stored in energy storage means upon detection of an acceleration or deceleration in excess of a certain threshold level, comprising: a firing pin urged by first spring means in a direction to cause the energy storage means to release its energy; a sensor mass which is urged by second spring means to a neutral state and guided to be moved against the spring force of the second spring means under its own inertia force upon detection of an acceleration or deceleration in excess of the threshold level; trigger means cooperating with the sensor mass for retaining the firing pin to its dormant state when the sensor mass is at the neutral state and releasing the firing pin when the sensor mass is moved under its own inertia force; and safety catch means which includes stopper means for preventing the propulsion of the firing pin under the spring force of the first spring means, the stopper means being adapted to be manually moved between a first position to allow the propulsion of the firing pin and a second position to prevent the propulsion of the firing pin. The stopper means, when it is placed at the second position, may additionally prevent the inertia motion of the sensor mass.

According to a preferred embodiment of the present invention, the firing pin is received in a guide bore extending through the sensor body in parallel with the direction of the inertia motion of the sensor mass, and the stopper means comprises a rotary shaft extending perpendicular to the plane of the inertia motion of the sensor mass and a part of a front end portion of the guide bore, the rotary shaft being provided with a first notch which permits the propulsion of the firing pin through the guide bore by aligning with the guide bore when the rotary shaft is at a first angular position corresponding to the first position of the stopper means, a projection provided in a front surface of the sensor mass, and a slot provided in the rotary shaft aligned with the projection of the sensor mass when the rotary shaft is at the first angular position. This arrangement provides the advantage of compact design.

Alternatively or additionally, the stopper means may comprise a plunger extending perpendicular to the plane of the motion of the sensor mass and adjacent to a part of a front end portion of the guide bore, the plunger being provided with a shutter member which permits the motion of the firing pin through the guide bore by being offset from the guide bore when the plunger is at a first linear position corresponding to the first position of the stopper means and prevents the motion of the firing pin through the guide bore by aligning with the guide bore when the plunger is at a second linear position corresponding to the second position of the stopper means.

According to a certain aspect of the present invention, the rotary shaft is provided with a second notch for preventing the propulsion of the firing pin by aligning with the guide bore when the rotary shaft is at the second angular position, the second notch being provided with a shoulder surface which prevents the rotation of the rotary shaft when the firing pin is engaged by the second notch. Also, the shutter member may be provided with a hole which is adapted to receive the front end of the firing pin when the firing pin is released from the trigger means. In either case, since the safety catch means cannot be released when the firing pin is disengaged from the trigger lever, the faulty propulsion of the firing pin, when the safety catch is released without detecting that the firing pin is disengaged from the trigger lever, can be avoided.

When the stopper means prevents the spooling out of a seat belt when the stopper means is placed at the second position, the vehicle occupant is ensured to be reminded of the failure to release the safety catch or to arm the deceleration sensor when the deceleration sensor is required to be operative. This can be conveniently implemented by the use of the plunger in combination with biasing means which urges the plunger towards the first linear position, and, preferably, the plunger is provided with a first end adapted to engage the seat belt when the plunger is at the second linear position. If the plunger is provided with a second end which projects from the casing of the deceleration sensor when the plunger is at the first linear position, the state of the safety catch can be visually ascertained in a very simple fashion.

It is possible to use the rotary shaft and the plunger at the same time as double safety measures. In that case, if a handle is attached to one end of the rotary shaft for turning the same, this also provides visual means for ascertaining the state of the safety catch means. According to a particularly preferred embodiment, the second end of the plunger, when the plunger is at the second position, interferes with the handle of the rotary shaft when the rotary shaft is at the second angular position, the failure to release the two safety catches is notified to the user as one item of indication for instance by prohibiting the spooling out of the seat belt, or by otherwise indicating it. Thus, the failure to arm the deceleration sensor when required is positively prevented.

BRIEF DESCRIPTION OF THE DRAWINGS

Now the present invention is described in the following in terms of a specific embodiment with reference to the appended drawings, in which.

DETAILED DESCRIPTION OF THE PREFERRED EMBODIMENT

Figure 1:
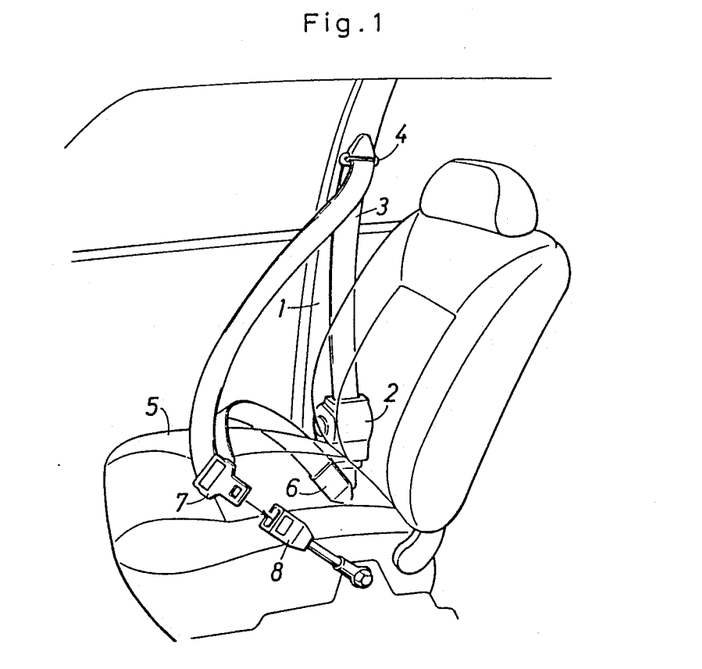
FIG. 1 is a simplified perspective view of a vehicle safety seat belt system to which the deceleration sensor of the present invention can be applied.

FIG. 1 shows a safety seat belt system to which the present invention is applied. A seat belt 3 from a retractor 2 provided at the lower end of a center pillar 1 of the vehicle body extends along the center pillar 1 and is passed through a through ring 4 attached to an upper part of the center pillar 1. The seat belt 3 then extends downwards from the through ring 4 and is anchored at its free end 6 to a rear, side portion of the seat 5 adjacent to the retractor 2. The span of the seat belt 3 between the through ring 4 and the anchored, terminal end 6 is passed through a tongue plate 7 so as to permit a sliding motion of the tongue plate 7 along the span of the seat belt 3. A buckle 8 is attached to a part of a floor tunnel adjacent to a rear, side (opposite to the side of the seat belt where the terminal end 6 of the seat belt is anchored) portion of the seat 5.

When a vehicle occupant is seated in the seat 5, the seat belt 3 is pulled out from the retractor 2 and the tongue plate 7 is passed in front of the occupant and fitted into the buckle 8 provided on the opposite side of the seat 5. Thus, the seat belt 3 is passed diagonally across the chest and laterally across the waist of the occupant.

Figure 2:
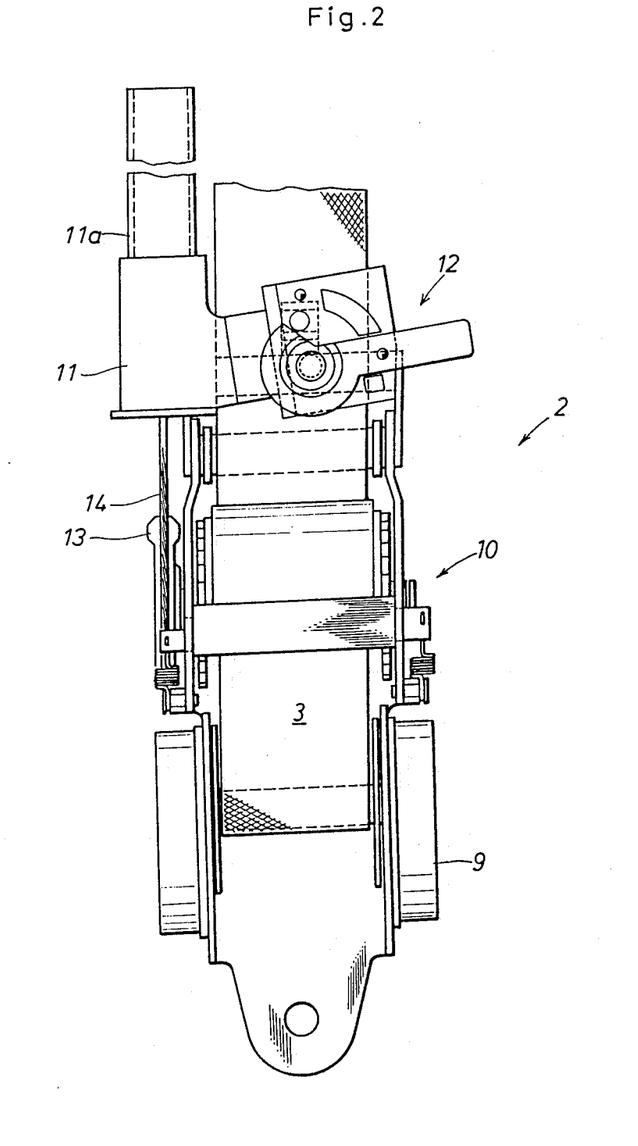
FIG. 2 is a magnified view of a part of FIG. 1 which is adapted to remove a slack from the seat belt upon detection of a deceleration indicative of a vehicle crash.

As shown FIG. 2, the retractor 2 is provided with an emergency locking retractor (ELR) unit 9 which permits free release of the seat belt 3 under normal condition, a tensioning unit 10 for removing a slack in the belt 3 in case of an emergency, a drive unit 11 for supplying necessary drive power to the tensioning unit 10, and a deceleration (acceleration) sensor 12 for detecting a level of deceleration indicative of vehicle crash. In this embodiment, the drive unit 11 comprises a tube 11a, an explosive cartridge received therein, a piston member which is adapted to be driven within the tube 11a by the explosive gas pressure and is connected to a drive pulley 13 of the tensioning unit 10 by way of a pull cable 14.

Figure 3:
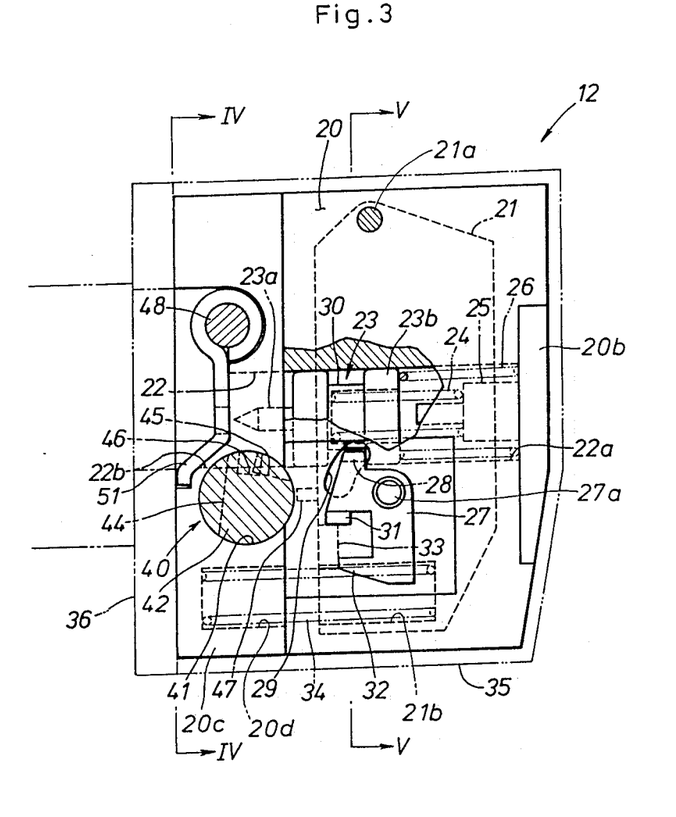
FIG. 3 is a partly broken-away side view of an embodiment of the deceleration sensor according to the present invention, showing the deceleration sensor in the disarmed state.
Figure 4:
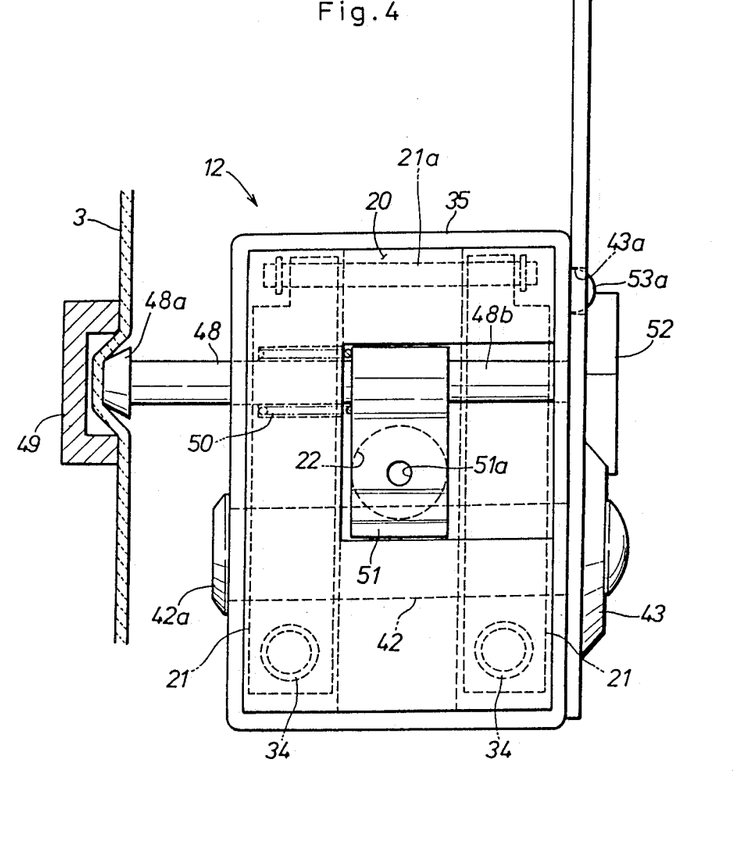
FIG. 4 is a sectional view taken along line IV—IV of FIG. 3 showing the deceleration sensor in the disarmed state.
Figure 5:
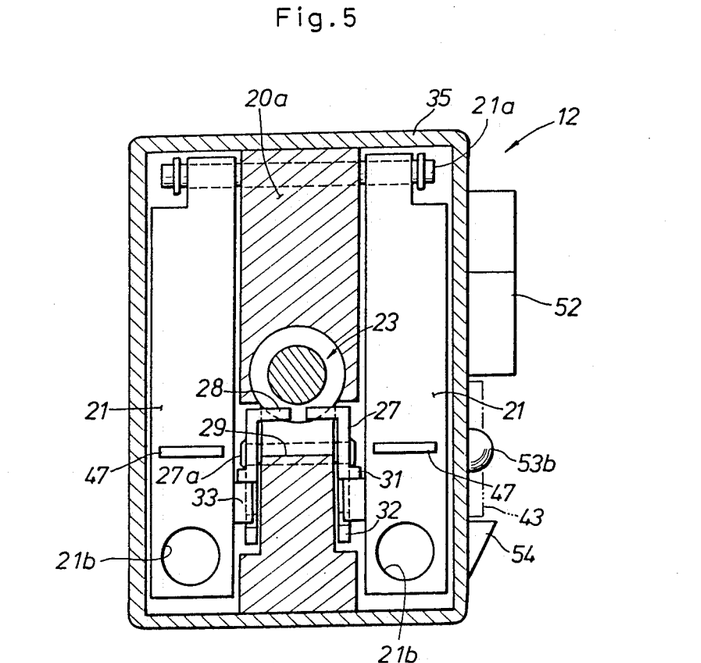
FIG. 5 is a sectional view taken along line V—V of FIG. 3.
Figure 6:
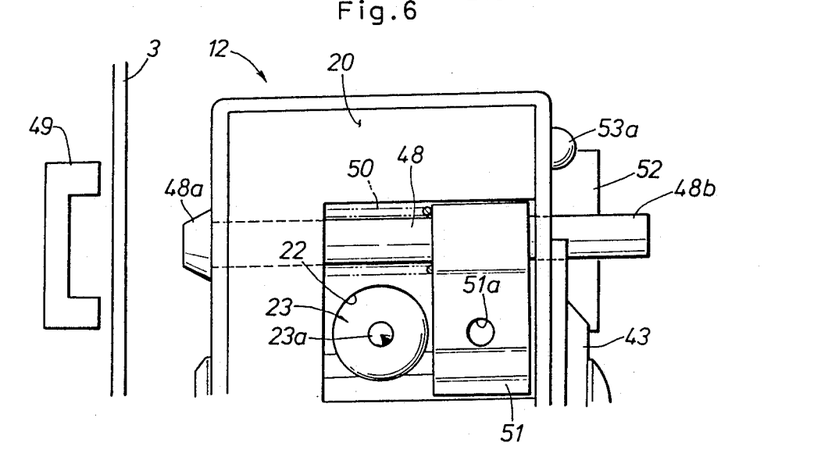
FIG. 6 is a view similar to FIG. 4 showing the armed state of the deceleration sensor.

FIGS. 3 through 5 show the deceleration sensor 12 in greater detail.

A pair of swing masses 21 are supported one on each side of the sensor body 20 by way of lateral pivot pin 21a provided at their upper ends in the manner of a pair of pendulums having pivot points at their upper ends. These two sensor masses 21 are permitted to move independently from each other without interfering with each other. A middle part 20a of the sensor body 20 intermediate between the two sensor masses 21 is provided with a central, cylindrical guide bore 22 extending through the middle part 20a of the sensor body 20 along a tangential direction of the motion of the sensor masses 21. The rear end of the central guide bore 22 is closed by a plate member 20b which is provided with a spring guide 25 consisting of a rod member which is coaxially received in the central guide bore 22 defining an annular gap therebetween at the rear end 22a of the guide bore 22. A firing pin 23 is guided within the central guide bore 22.

The firing pin 23 is provided with a pointed front end 23a and a cylindrical main body, which is hollow in its rear end, and is guided within the central guide bore 22. A pair of coaxially arranged compression coil springs 24 and 26 having different diameters urge the firing pin 23 forwardly or towards the front end 22b of the guide bore 22, one of the compression springs 24 interposed between the annular shoulder surface of the spring guide 25 and the rear end surface of the bottom of the hollow rear part of the firing pin 23 while the other compression coil spring 26 is interposed between the rear most end surface of the firing pin 23 and the inner surface of the plate member 20b.

A pair of trigger levers 27 are supported one on either side of the middle part 20a of the sensor body 20 by means of a common shaft 27a passed laterally through the middle part 20a of the sensor body 20 and integrally connected to the trigger levers 27. A front end of each of the trigger levers 27 is bent into a lateral and inward projection 28 which is passed through an arcuate slot 29 provided in the middle part 20a of the sensor body 20 and engages an annular groove 30 provided in a middle part of the firing pin 23. A part of each of the trigger levers 27 adjacent to the corresponding inward projection 28 is bent into a lateral and outward projection 31 which rests upon the upper surface of an inwardly directed, rectangular projection 33 provided in the inner surface of each of the sensor masses 21. Another part of each of the trigger levers 27 located on the other side of the pivot shaft 27a is shaped into a hook 32 which abuts the rear surface of the rectangular projection 33 of the corresponding sensor mass 21 and extends along the lower surface of the rectangular projection 33.

A lower part 20c of the sensor body 20 is provided with a pair of parallel bores 20d extending in parallel with the central guide bore 22, each of the parallel bores 20d having a closed front end and an open rear end. Each of these bores 20d receives the front end of a compression coil spring 34 whose rear end is received in a similar bore 21b provided in a lower part of the corresponding sensor mass 21. Thereby, the sensor mass 21 is urged rearwardly with respect to the sensor body 20 by these compression coil springs 34.

The firing pin 23 is thus urged forwardly by the two concentric compression coil springs 24 and 26 but is held in the position illustrated in FIG. 3 by the projections 28 of the trigger levers 27 which are in turn held in the positions illustrated in FIG. 3 by their hooked portions 32 engaging the lateral projections 33 of the sensor masses 21.

Either side of this deceleration sensor 12 is covered by a casing 35, and the front end surface of the sensor body 20 is securely attached to the housing 36 of the drive unit 11.

This deceleration sensor 12 is typically constructed as a sub-assembly of the retractor unit 2. The retractor unit 2 is typically manufactured at a plant which is remote from the automobile assembly plant and, therefore, has to be transported from the manufacturing plant to the assembly plant. In order to improve the handling of the retractor unit 2, it is highly desirable for the deceleration sensor 12 to be provided with safety catch means which can disarm the deceleration sensor and make it insensitive to decelerations of large magnitudes.

To this end, the safety catch 40 of the present embodiment comprises a cylindrical rotary shaft 42 which is passed through a bore 41 extending laterally through a front part of the sensor body 20 in front of the main body of the firing pin 23. This rotary shaft 42 is provided with a head 42a at its one end and is crimped upon the base end of a set lever 43 made of elastic sheet metal at its other end so that the rotary shaft 42 may be turned about its central axial line by acting upon the set lever 43 (FIG. 4).

Figure 11:
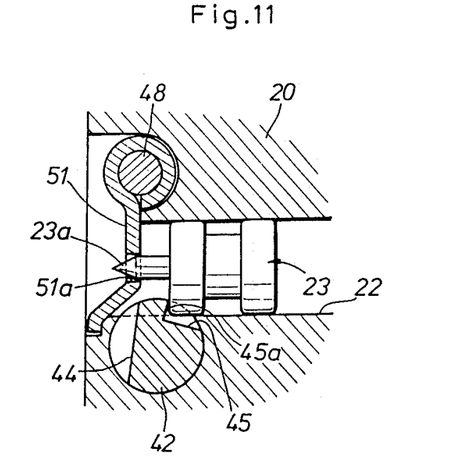
FIG. 11 is an enlarged view of the firing pin being disengaged from the trigger levers and stopped by the shutter plate of the plunger and the stop notch of the rotary shaft.
Figure 12:
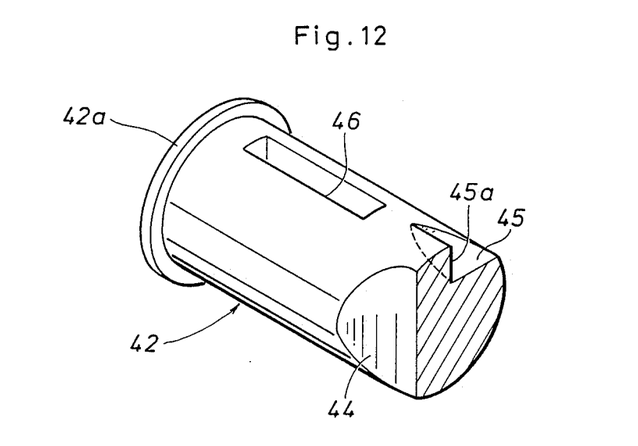
FIG. 12 is an enlarged, fragmentary sectional view of the rotary shaft.

As best shown in FIGS. 11 and 12, the middle part of the rotary shaft 42, which operates along with the guide bore 22, is provided with a pair of notches 44 and 45 which are angularly displaced by approximately 90 degrees. One of the notches (pass notch) 44 extends across the rotary shaft 42 while the other notch (stop notch) 45 stops at a shoulder surface 45a located at a middle point along the tangential direction of the rotary shaft 42. The parts of the rotary shaft 42 located on either side of the notches 44 and 45 are provided with rectangular slots 46 (FIG. 12). The front surfaces of the sensor masses 21 opposing the rotary shaft 42 are provided with projections 47 (FIG. 5) which correspond to the rectangular slots 46 of the rotary shaft 42.

A set plunger 48 is passed laterally across the casing 35 and the sensor body 20 above the rotary shaft 42. One end of this set plunger 48 is provided with a head 48a so as to oppose a run of the seat belt 3 while the other end 48b of the set plunger 48 moves into and out of the casing 35. A shutter plate 51 fixedly depends from a middle part of the set plunger 48. A compression coil spring 50 is interposed between a part of the sensor body 20 and the shutter plate 51; the set plunger 48 is thereby urged in the direction to protrude out of the casing at its other end 48b as far as the head 48a abutting the external surface of the casing 35 permits.

When this set plunger 48 is pushed completely into the sensor casing 35 from its other end 48b against the spring force of the compression coil spring 50, a central hole 51a provided in the shutter plate 51 aligns with the pointed front end 23a of the firing pin 23 and the head 48a of the set plunger 48 presses the seat belt 3 against a backing plate 49 having a depression facing the seat belt 3. When the set plunger 48 is moved into this position as described hereinafter (FIG. 4), the firing pin 23 is prevented from being propelled forwardly by the shutter plate 51 on one hand, and the seat belt 3 is prevented from being paid out by being squeezed between the backing plate 49 and the head 48a of the set plunger 48.

Figure 7:
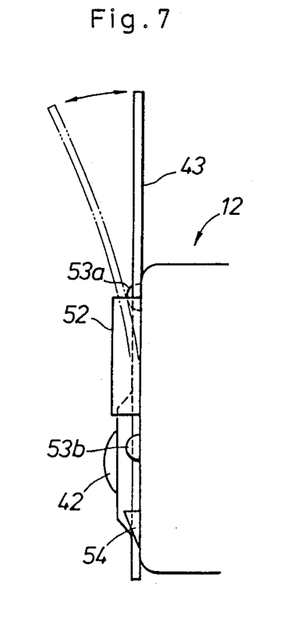
FIGS. 7 through 9 are illustrative views showing the mode of operation of the set lever.
Figure 8:
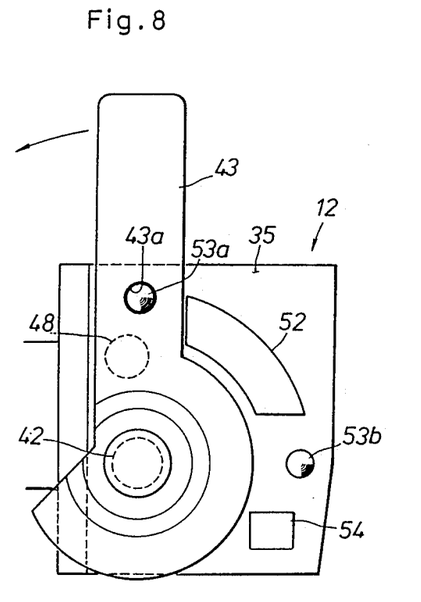
Figure 9:
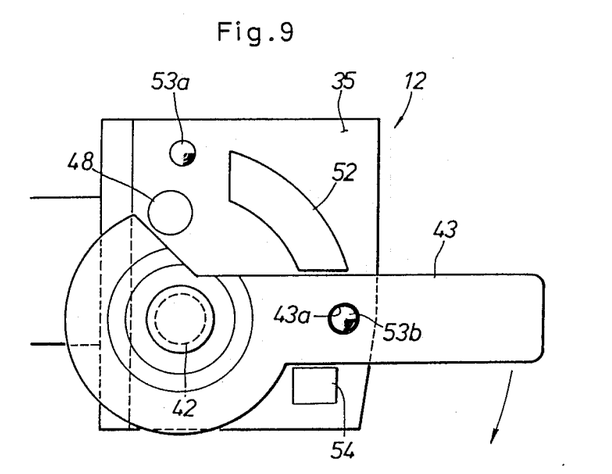
Figure 10:
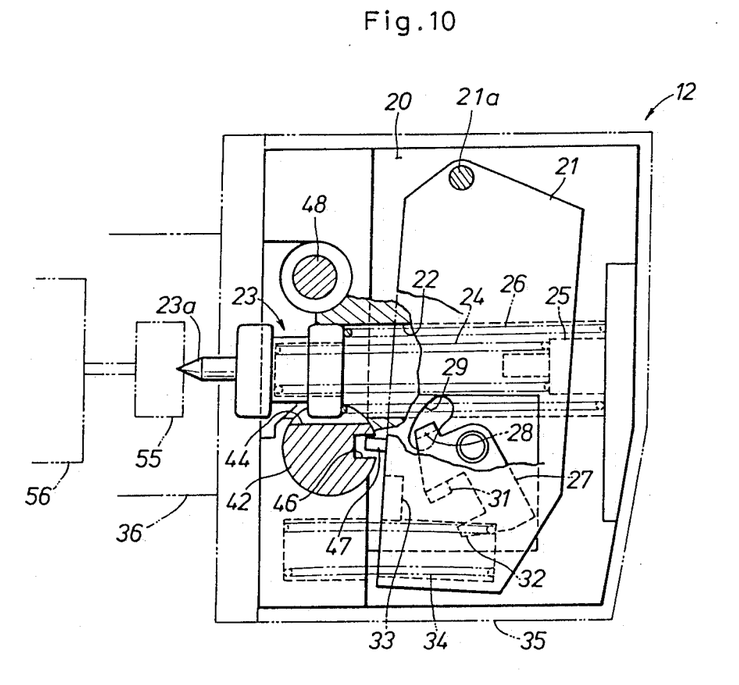
FIG. 10 is a view similar to FIG. 3 showing the armed state of the deceleration sensor.

The set lever 43 is made of elastic sheet metal, and can be turned about the set plunger 48 over the angle of approximately 270 degrees because of an arcuate projection 52 provided in the casing 35 as shown in FIGS. 7 through 9. The two limit positions are provided with spherical positioning projections 53a and 53b which are adapted to fitted into a hole 43a provided in the set lever 43. When the free end of the set lever 43 is directed upwardly as shown in FIG. 8, the safety catch 40 is on with the stop notch 45 and the slots 46 obstructing the firing pin 23 and the sensor masses 21 from being released, respectively, as shown in FIGS. 3 and 11. On the other hand, when the free end of the set lever 43 extends laterally to the right as shown in FIG. 9, the safety catch 40 is off with the pass notch 44 and the slots 46 permitting the release of the firing pin 23 and the sensor masses 21, as shown in FIG. 10. A rectangular stopper projection 54 is provided in the casing 35 adjacent to the limit position for releasing the firing pin 23 for fixing the set lever 43 at this position. However, by elastically bending the set lever 43 away from the casing 35 as shown in FIG. 7, the set lever 43 may be turned past the stopper projection 54 towards the other limit position for obstructing the release of the firing pin 23.

Now the action of the present embodiment is described in the following, mainly with reference to FIGS. 10 and 11.

When the safety catch 40 is off, the pass notch 44 aligns with the guide bore 22, and the rectangular slots 46 of the rotary shaft 42 squarely oppose the rectangular projections 47 of the sensor masses 21, as shown in FIG. 10. Therefore, in this state, nothing obstructs the forward motion of the sensor masses 21 or the firing pin 23 except for the trigger levers 27. Therefore, when a deceleration in excess of a certain threshold level is applied to the vehicle along straight ahead direction of the vehicle, the inertia forces acting upon the sensor masses 21 overcomes the spring force of the compression coil springs 34, and the sensor masses 21 are thereby rotated forwardly about the pivot shaft 21a.

As a result, the outward projections 31 of the trigger levers 27 are disengaged from the projections 33 of the sensor masses 21, and the firing pin 23 is disengaged from the inward projections 28 of the trigger levers 27. Thus, the firing pin 23 is propelled forwardly under the spring force of the compression coil springs 24 and 26, and strikes upon a fuse 55, which is placed in the housing 36 of the drive unit 11 so as to squarely oppose the front end 22b of the guide bore 22 (FIG. 10).

When the pointed front end 23a of the firing pin 23 strikes the fuse 55, the propellant 56 serving as energy storage means is ignited, and propels a piston (not shown in the drawings) received in the tube 11a of the drive unit 11. Since the piston is connected to the wire 14, the ignition of the propellant drives the pulley 13 in the direction to retract the seat belt 3. Thus, the slack of the seat belt 3 is removed, and a positive restraint of the vehicle occupant by the seat belt 3 becomes possible.

In such a deceleration sensor, the propulsion of the firing pin 23 must not occur in its sub-assembled state before it is installed into a vehicle, under any circumstance. According to the present invention, when the safety catch 40 is on as shown in FIG. 3, since the circumferential surface of the rotary shaft 42 interferes with the square projections 47 of the sensor masses 21, the sensor masses 21 are not able to move forward even in a large deceleration condition. Furthermore, the stop notch 45 prevents the propulsion of the firing pin 23 even when the trigger levers 27 have disengaged the firing pin 23 therefrom. Yet further, the shutter plate 51 can stop the firing pin 23 even when the stop notch 45 is incapable of stopping the firing pin 23. Thus, the firing pin 23 is protected from erroneous propulsion by triple safety measures. Furthermore, because the rotary shaft 42 cannot be turned with the shoulder surface 45a abutting the firing pin 23 when the firing pin 23 is disengaged from the trigger levers 27, the unexpected propulsion of the firing pin 23 upon releasing of the safety catch 40 can be avoided. Also, in this condition, since the pointed front end 23a of the firing pin is received in the hole 51a of the shutter plate 51, the set plunger 48 cannot be moved, and the erroneous propulsion of the firing pin 23 can be avoided.

On the other hand, once the deceleration sensor 12 is installed into a vehicle, it is necessary to ensure the safety catch 40 is turned off or disabled.

According to the present embodiment, the set lever 43 and the other end 48b of the set plunger 48 are visible from outside, and their positions can be readily ascertained by simple visual inspection.

Further, when the set lever 43 is placed at the limit position corresponding to the disarmed condition of the deceleration sensor or, in other words, when the deceleration sensor is to be made inoperable, since the protruding end 48b of the set plunger 48 interferes with the set lever 43, the protruding end 48b of the set plunger 48 must be pushed into the casing 35. In this condition, since the set plunger 48 protrudes out of the casing 35 with its head 48a first against the spring force of the compression coil spring 50, and the seat belt 3 is securely held between the backing plate 49 and the head 48a of the set plunger 48, the seat belt 3 would not be spooled out from the retractor and the vehicle occupant can see that the safety catch 40 is on. Thus, the possibility of the failure to arm the deceleration sensor after installing it into a vehicle is eliminated.

On the other hand, when the set lever 43 is placed at the other limit position corresponding to the armed condition of the deceleration sensor or, in other words, when the deceleration sensor is to be made operable, since the set plunger 48 protrudes with its other end 48b first under the spring force of the compression coil spring 50, the shutter plate 51 is automatically placed out of the way of the firing pin 23. Thus, by a single stroke, the double safety measures can be taken, and the possibility of failing to enable one of the safety measures is entirely eliminated.

Although the present invention has been described in terms of a preferred embodiment applied to a system for removing a slack from a seat belt upon detection of a vehicle crash, it can be applied to other passive vehicle occupant restraint systems such as air bag systems among other possible applications where detection of a threshold level of deceleration or acceleration is required. Also, the various features disclosed in this application can be either jointly or separately used, possibly in combination with other known safety measures which are not mentioned in this application.

While the invention has been particularly shown and described in reference to preferred embodiments thereof, it will be understood by those skilled in the art that changes in form and details may be made therein without departing from the spirit and scope of the invention.

What we claim is:

1. A deceleration sensor for releasing energy stored in energy storage means upon detection of an acceleration or deceleration in excess of a certain threshold level, comprising:

a firing pin urged by first spring means in a direction to thereby cause said energy storage means to release its energy;

a sensor mass which is urged by second spring means to a neutral state and guided to be moved against the spring force of said second spring means under its own inertial force upon detection of an acceleration or deceleration in excess of said threshold level;

trigger means cooperating with said sensor mass for retaining said firing pin to its dormant state when said sensor mass is at said neutral state and releasing said firing pin when said sensor mass is moved under its own inertial force; and safety catch means which includes stopper means for directly restraining a front end portion and a body portion of said firing pin and for directly preventing the propulsion of said firing pin under the spring force of said first spring means, said stopper means being adapted to be manually moved in a single stroke between a first position for substantially releasing said portions of said firing pin being restrained and for allowing the propulsion of said firing pin, and a second position for preventing the propulsion of said firing pin.

2. A deceleration sensor as defined in claim 1, wherein said stopper means, when placed at said second position, is for further preventing the inertial motion of said sensor mass.

3. A deceleration sensor as defined in claim 2, wherein said firing pin is received in a guide bore extending through a sensor body of said deceleration sensor in parallel with a tangential direction of the inertial motion of said sensor mass, and said stopper means comprises a rotary shaft extending substantially perpendicular to the plane of the inertial motion of said sensor mass and a part of a front end portion of said guide bore, said rotary shaft being provided with a first notch which permits the propulsion of said firing pin through said guide bore by aligning with said guide bore when said rotary shaft is at a first angular position corresponding to said first position of said stopper means, a projection provided in a front surface of said sensor mass, and a slot provided in said rotary shaft aligned with said projection of said sensor mass when said rotary shaft is at said first angular position.

4. A deceleration sensor as defined in claim 3, wherein said rotary shaft is provided with a second notch for preventing the propulsion of said firing pin by aligning with said guide bore when said rotary shaft is at said second angular position, said second notch being provided with a shoulder surface which prevents the rotation of said rotary shaft when said firing pin is engaged by said second notch.

5. A deceleration sensor as defined in claim 1, wherein said stopper means is for further preventing the spooling out of a seat belt when said stopper means is placed at said second position.

6. A deceleration sensor as defined in claim 5, wherein said stopper means comprises a plunger extending perpendicular to the plane of the motion of said sensor mass and adjacent to a part of a front end portion of a guide bore for accommodating said firing pin, said plunger being provided with a shutter member which permits the motion of said firing pin through said guide bore by being offset from said guide bore when said plunger is at a first linear position corresponding to said first position of said stopper means and prevents the motion of said firing pin through said guide bore by aligning with said guide bore when said plunger is at a second linear position corresponding to said second position of said stopper means.

7. A deceleration sensor as defined in claim 6, wherein said stopper means further comprises biasing means which urges said plunger towards said first linear position, wherein said deceleration sensor has a casing and wherein said plunger is provided with a first end adapted to engage said seat belt when said plunger is at said second linear position and a second end which projects from the casing of said deceleration sensor when said plunger is at said first linear position.

8. A deceleration sensor as defined in claim 6, wherein said stopper means further comprises a rotary shaft extending perpendicular to the plane of the motion of said sensor mass and a part of a front end portion of said guide bore and a handle attached to one end of said rotary shaft for turning the same, said rotary shaft being provided with a first notch which permits the motion of said firing pin through said guide bore by aligning with said guide bore when said rotary shaft is at a first angular position corresponding to said first position of said stopper member, said second end of said plunger, when said plunger is at said first linear position, interfering with the rotation of said handle of said rotary shaft when said rotary shaft is at said second angular position.

9. A deceleration sensor as defined in claim 6, wherein said shutter member is provided with a hole which is adapted to receive the front end of said firing pin when said firing pin is released from said trigger means.

* * * * *